United States Patent
Holtgraver et al.

(10) Patent No.: US 10,533,583 B2
(45) Date of Patent: Jan. 14, 2020

(54) SYSTEM FOR DETERMINING SAFETY MARGIN OF AN INSTALLED DRIVEN MEMBER

(71) Applicant: QTRCO, Inc., Tomball, TX (US)

(72) Inventors: Edward G. Holtgraver, Tomball, TX (US); James R. Howard, Tomball, TX (US)

(73) Assignee: QTRCO, Inc., Tomball, TX (US)

( * ) Notice: Subject to any disclaimer, the term of this patent is extended or adjusted under 35 U.S.C. 154(b) by 157 days.

(21) Appl. No.: 15/871,757

(22) Filed: Jan. 15, 2018

(65) Prior Publication Data
US 2018/0135665 A1    May 17, 2018

Related U.S. Application Data

(63) Continuation-in-part of application No. 15/140,699, filed on Apr. 28, 2016, now Pat. No. 10,132,337.

(51) Int. Cl.
*F15B 11/036* (2006.01)
*F16H 19/04* (2006.01)

(52) U.S. Cl.
CPC .......... *F15B 11/0365* (2013.01); *F16H 19/04* (2013.01)

(58) Field of Classification Search
CPC .............. F15B 11/0365; F15B 15/2807; F15B 15/1409; F15B 19/005; F15B 20/00; F15B 2211/6313; F15B 2211/7052; F15B 2211/85; F15B 2211/857; F15B 2211/8755; F16H 19/04; F16K 31/1635; F16K 31/1221; F16K 31/54; F16K 37/0041
See application file for complete search history.

(56) References Cited

U.S. PATENT DOCUMENTS

| | | | | |
|---|---|---|---|---|
| 3,818,808 A | * | 6/1974 | Shafer | F01B 1/12 92/138 |
| 3,824,901 A | * | 7/1974 | Shafer | F15B 15/066 92/13.6 |
| 5,601,110 A | * | 2/1997 | Rembert | F15B 15/261 137/316 |
| 7,698,991 B2 | * | 4/2010 | Sato | F16K 31/1635 92/130 C |
| 8,056,466 B2 | * | 11/2011 | Bravo | F15B 15/066 251/285 |
| 8,087,316 B2 | * | 1/2012 | Holtgraver | F16K 31/1635 74/50 |
| 8,925,895 B2 | * | 1/2015 | Takemoto | F15B 19/005 137/554 |
| 9,810,245 B2 | * | 11/2017 | Jaccoby | F15B 15/02 |
| 10,132,337 B2 | * | 11/2018 | Holtgraver | F15B 15/2815 |
| 2012/0211681 A1 | * | 8/2012 | Wang | F16K 31/1635 251/30.01 |

* cited by examiner

*Primary Examiner* — Eric Keasel
(74) *Attorney, Agent, or Firm* — Bushman Werner, P.C.

(57) ABSTRACT

A system for determining the operability of a valve in active service which provides a user with real time information pertaining to the Safety Margin, the valve torque or thrust, and the percentage of valve MAST that is required for operation. The system employs a combination of an actuator package comprised of a primary actuator, a tandem force module, and a controller operatively connected to the output shaft of the primary actuator, the controller including a processor for calculating the above-described values and providing an output which can be visually, audibly, or electronically observed.

7 Claims, 7 Drawing Sheets

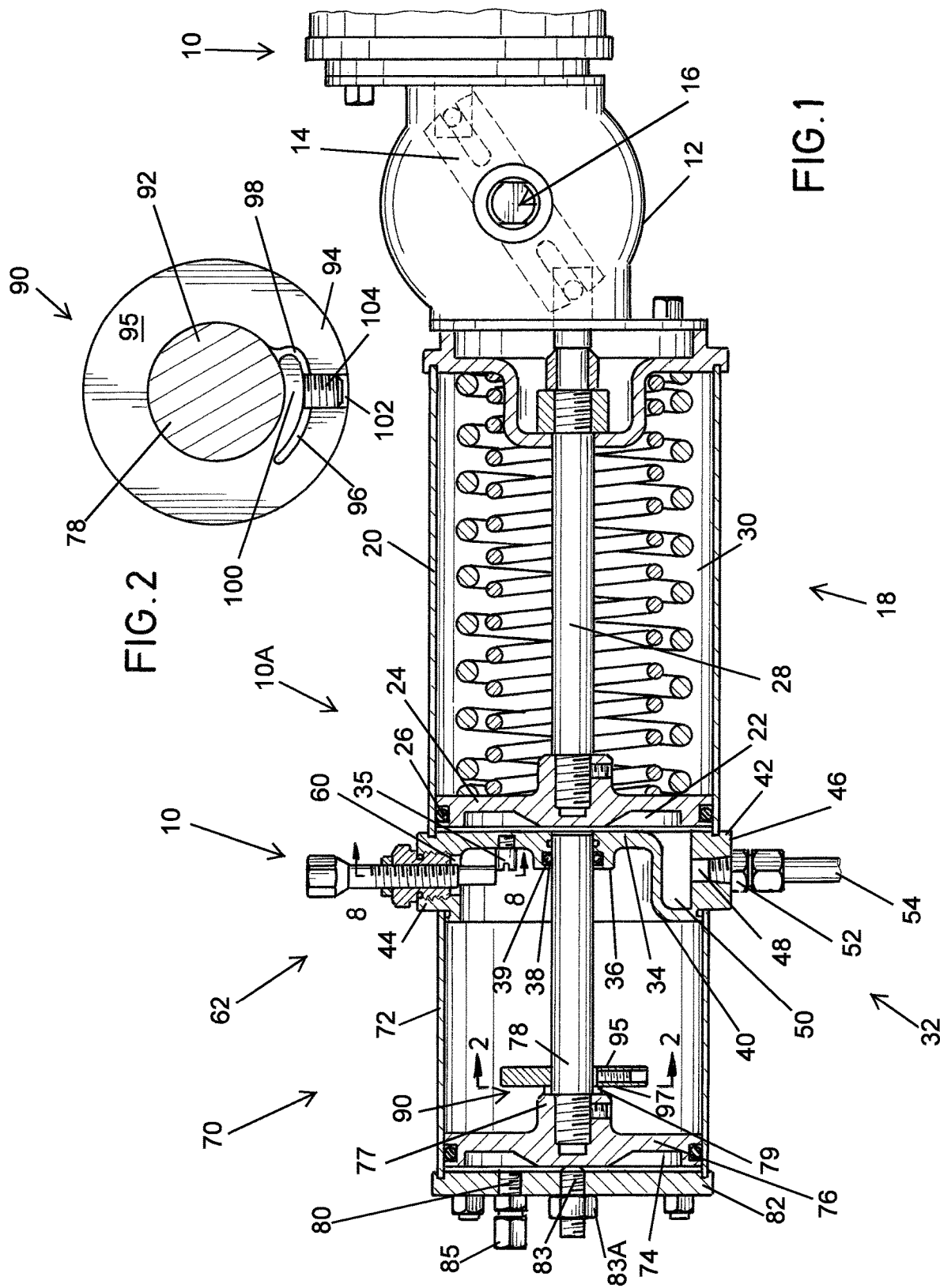

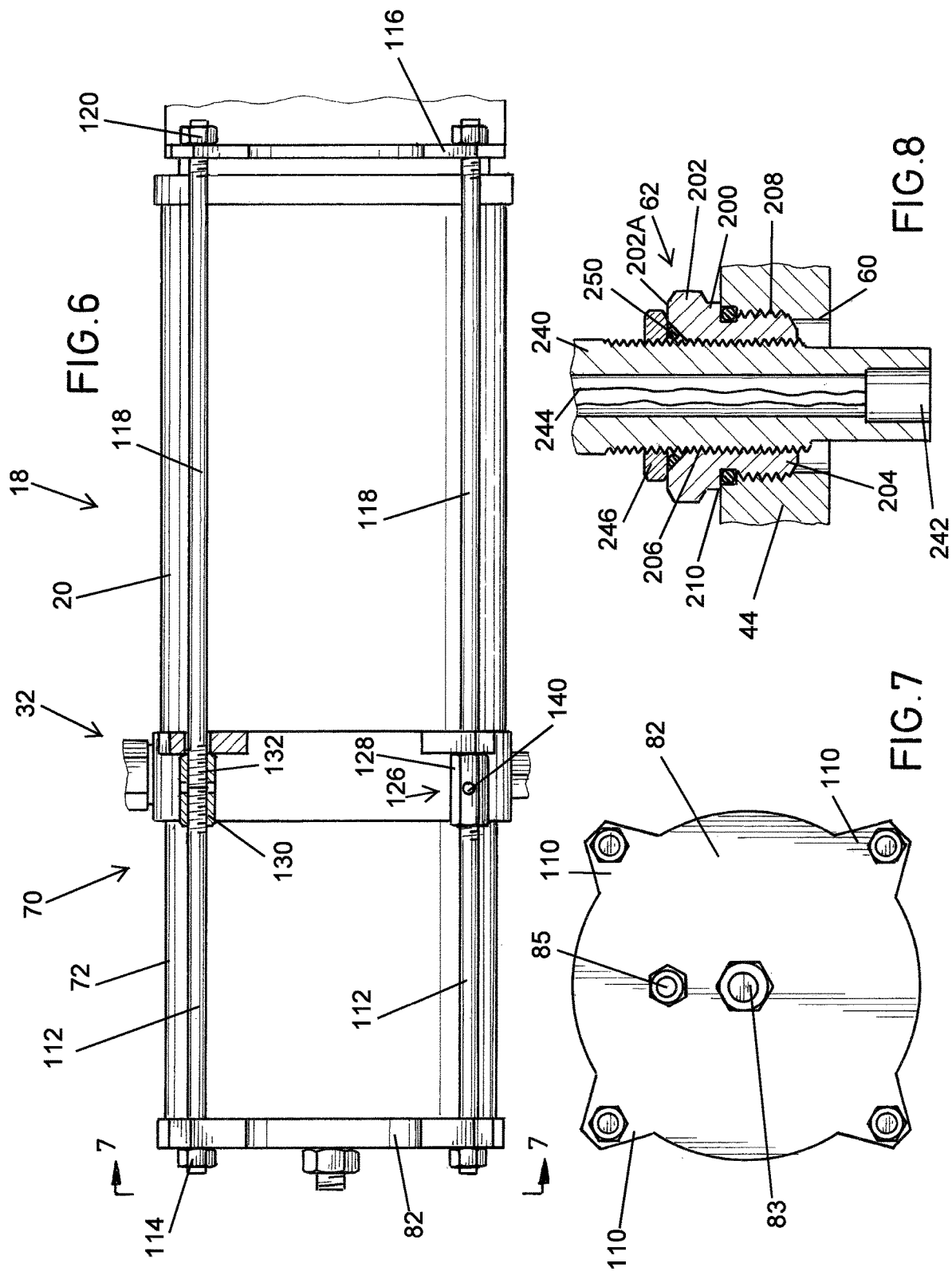

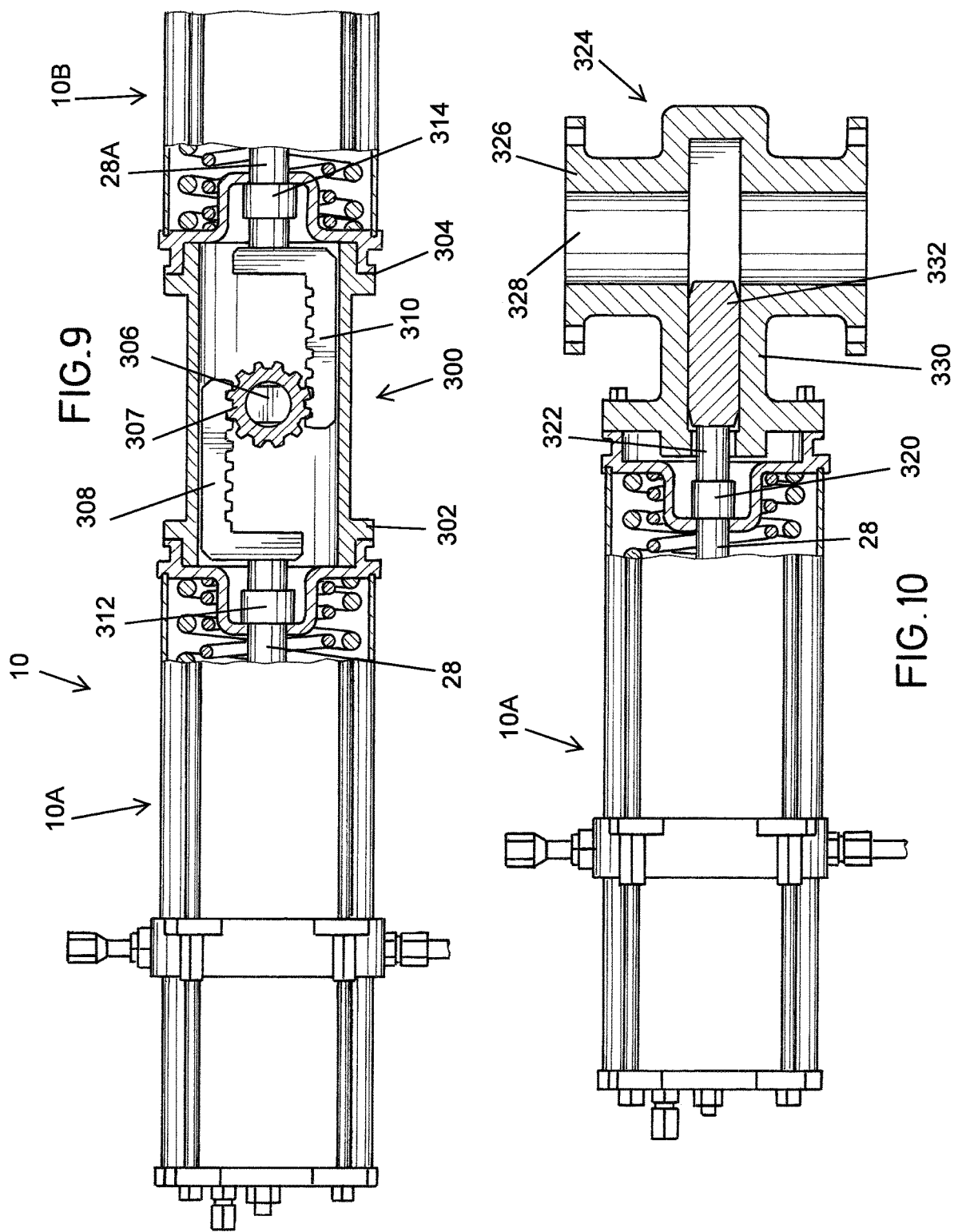

SYSTEM FOR DETERMINING SAFETY MARGIN OF AN INSTALLED DRIVEN MEMBER

CROSS REFERENCE TO RELATED APPLICATION

This application is a continuation-in-part of U.S. application Ser. No. 15/140,699 filed on Apr. 28, 2016, the disclosure of which is incorporated herein by reference for all purposes.

FIELD OF THE INVENTION

The present invention relates to actuators, e.g., valve actuators, and particularly to a system for determining the safety margin of an installed valve/valve actuator combination.

BACKGROUND OF THE INVENTION

In the oil, gas, petroleum, and power industries, emergency shutdown of a process must be provided for under certain fault conditions.

An emergency shutdown (ESD) system is usually implemented by pneumatically controlled shut off valves, which generally remain open while the process is operating safely. These valves are usually only closed when an emergency shut down is required, or for maintenance. Often, processes operate for long periods of time, e.g., years, without shutting down. As the shutdown valves are operated infrequently, there is a high possibility that they will stick or freeze when the shutdown operation is required, thus resulting in a dangerous condition if an emergency shutdown has been requested.

The problem can be exacerbated by economic conditions which lead to a reduction in the frequency of shutdowns or turn-arounds. For example, in some operations a process may run continuously for one or more years without shutting down the process for maintenance.

State-of-the-art ESD systems, which control shut-off valves, have a number of features to detect plant or process failures and typically include redundancies for added reliability. However, such systems may not provide for the testing of shut-off valves themselves, other than full stroking the valve. However, the problem with full stroking or completely closing the valve is that it causes an undesirable disruption in the process. To alleviate the problem, partial stroke testing systems have been developed. In a partial stroke test (PST), a valve is partially closed in order to confirm that it is not stuck in an open position.

PST is not only applicable to safety related applications but can also be used to enhance the operation of the valve. For example, in many process applications, the chemical composition of the flowing stream can cause material to build up on the valve internal body and trim surfaces. Over time this build-up may cause the valve to "stick" in that position and not stroke. PST can be used to simply "exercise" the valve while allowing it to partially stroke, keeping the valve surfaces that are required to move free from material build up.

Many PST systems use mechanical hard stop devices which normally require a purpose-built actuator with integral manually engaged travel stops or add-on type manually engaged stops mounted as an interface between the actuator and the valve. These mechanical stops offer the benefits of hard travel stops to prevent spurious over travel and allow full actuator torque output to operate a valve experiencing stiction. However, they suffer from several disadvantages in that they require extensive operator training and procedures both for engagement and disengagement operations. Furthermore, they typically cannot be immediately disengaged should an ESD occur during partial stroke testing. This severely compromises safety.

Other common PST systems have no hard stops but rely instead on the careful release of air pressure to allow the spring inside of the actuator to move the actuator and valve to a desired partial stroke position which is chosen to both provide maximum valve motion without disrupting the controlled process. However, as only a small percentage of the air pressure can be released, the available torque or force output from the actuator is only a very small percentage of the actuator rated torque or force. As a result, a small change in the valve resistance to motion is sufficient to prevent the small actuator output to cause valve motion. In this situation, additional air must be released to develop sufficient actuator output, however, at the resulting pressure the actuator will cause excessive (spurious) valve travel and a resultant process disruption.

In order to prevent spurious motion, designers of such PST systems program pressure and time limits so that if either is exceeded the PS test is aborted. Thus the user has what is called a false failure whereby maintenance must be performed to determine the cause of the failure. Too often nothing is found other than a slight resistance to valve motion. As the process must be shut down for this maintenance action, the PST system causes the very process disruption that it was designed to prevent.

Fluid driven actuators are selected based on many factors with the most critical being that the actuator provide sufficient torque or thrust to operate an attached valve. It is common, when sizing an actuator for an application, to apply a safety factor to the expected valve requirements to ensure adequate output from the actuator. Typical safety factors range from 1.25 to 2.0 which results in the selection of an actuator having 1.25 to 2.0 times the expected valve torque or thrust requirement. When selecting the safety factor, care is required to assure that the actuator output will not exceed the valve MAST value provided by the valve maker.

Despite the initial design safety factor, once the assembly is installed and operational, users desire to know the actual safety margin at time of installation and also as the assembly ages, where debris accumulation, corrosion and user process changes may impact actuator output and valve requirements.

Some valves are in almost constant motion as they control the flow of fluid. Others see little motion as they are used to isolate a portion of a process to enable maintenance and others have long periods of inactivity as they are employed to safety shutdown a process in the event of an emergency. Users are interested in the installed safety margin for many of their valves but especially for those that are inactive for long periods and which are critical to the safety of the plant and personnel.

As described above, for critical safety shutdown valves, suppliers have offered what is referred to as Partial Stroke Testing Devices, described herein. These are used to exhaust pressure from a spring return actuator until the spring force causes the valve to move to a partially closed position that is less than what would cause disruption of the process. Users are required to periodically perform a partial stroke test to confirm the functional capability of these valves.

The amount of pressure to be exhausted and the time required to move to the partial stroke position is determined by pre-installation testing of the actuator. However, once installed, the valve and the process itself, cause changes to the valve input requirements, and thereby rendering the pre-installation parameters invalid. Establishment of the pressure and time parameters after installation is not practical as the required trials would result is severe process disruption. Thus, unable to test in the active process, and unable to account for changes due to debris, corrosion and process changes, suppliers are forced to program their devices to abort a partial stroke test if the pressure falls below the tested value or if the partial stroke position is not achieved within the tested time. Given the installed pressure and time inherently deviate from the programmed values, users experience considerable numbers of aborted tests, referred to as false failures. The resulting maintenance requirements has led to a diminished interest in partial stroke testing.

Any system designed to monitor actuator and valve performance must do so in a manner that is safe, that does not disrupt the controlled process, and which does not provide false failures.

From the above it can be seen that several parameters are important to the use of the system of the present invention, to wit:

Safety Factor: the ratio of the expected actuator output to the expected valve torque or thrust requirement and is intended to assure that the actuator will properly operate the valve once installed in an active pipeline. Basically, safety factor is a given multiple of the valves' operating torque (a known parameter).

Safety Margin: the actual ratio of actuator output to the actual valve torque or thrust requirement when operating in an active pipeline.

MAST: the Maximum Allowed Stem Torque or Thrust, which is the value at which some part of the valve, usually the stem (or shaft), may be damaged by excessive actuator output.

SUMMARY OF THE INVENTION

In one aspect the present invention provides a system for determining the Safety Margin of an installed actuator, the actual required valve torque or thrust and the actual required valve torque or thrust as a percentage of the valve's MAST.

In another aspect, the present invention provides a system for determining the Safety Margin of an installed actuator wherein a value reflective of the Safety Margin can be visually, audibly or electronically observed either proximal to the valve or at a remote-control facility.

These and further features and advantages of the present invention will become apparent from the following detailed description, wherein reference is made to the figures in the accompanying drawings.

BRIEF DESCRIPTION OF THE DRAWINGS

FIG. 1 is a bottom plan view, partly in section of an embodiment of the actuator assembly of the present invention.

FIG. 2 is a cross-sectional view taken along the lines 2-2 of FIG. 1.

FIG. 6 is an elevational view, partly in section, showing the tie rod assemblies used to connect a force module to a tandem piston assembly.

FIG. 7 is a view taken along the lines 7-7 of FIG. 6.

FIG. 8 is an enlarged view taken along the lines 8-8 of FIG. 1.

FIG. 9 is a bottom elevational view, partly in section showing another embodiment of the actuator assembly of the present invention.

FIG. 10 is an elevational view, partly in section of another embodiment of the actuator assembly of the present invention involving the use of linear actuation.

DETAILED DESCRIPTION OF PREFERRED EMBODIMENTS

Figure 3:
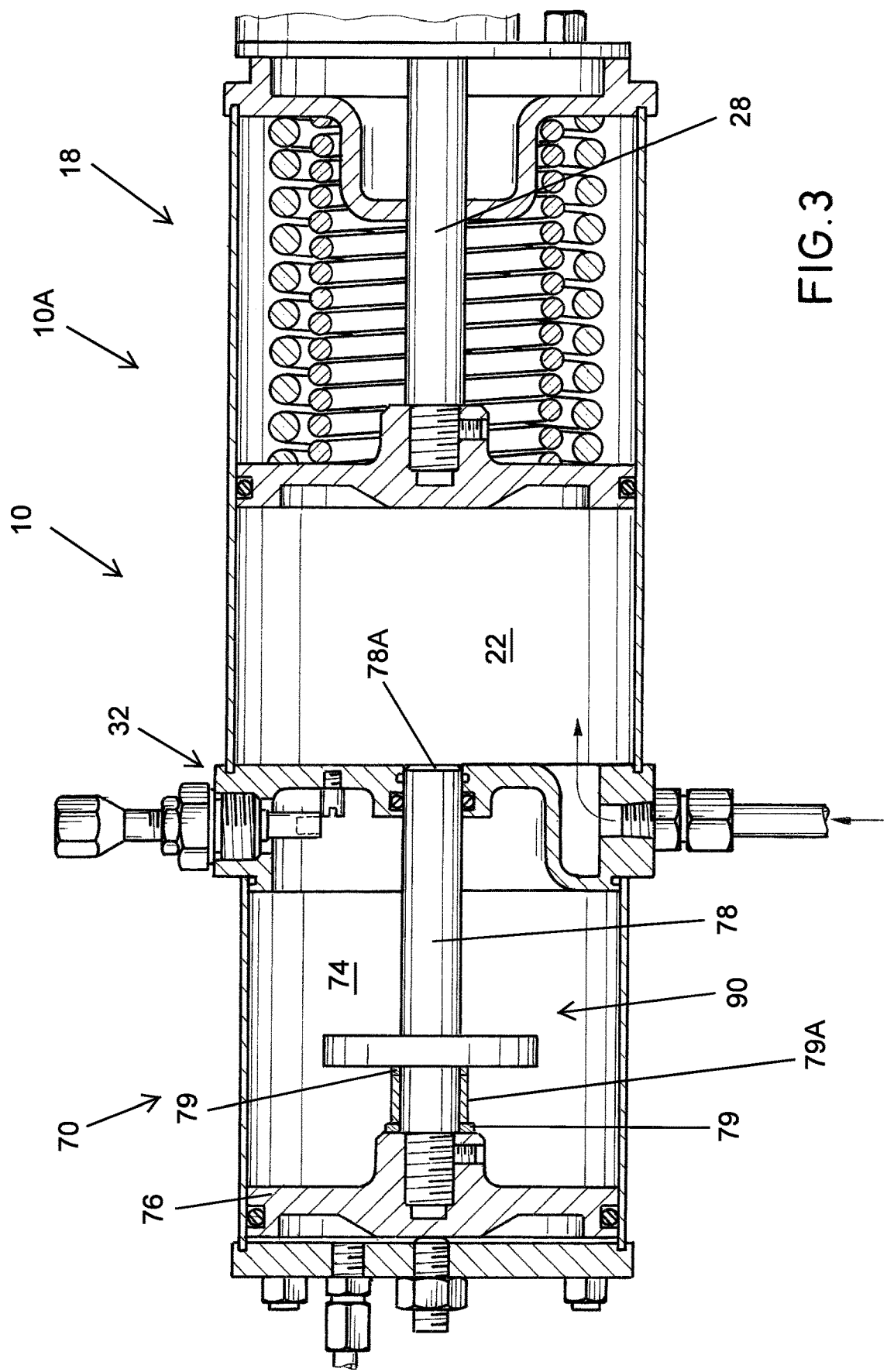
FIG. 3 is an enlarged view showing a portion of the actuator assembly of the present invention in a first position.

As used herein, the terms "connected," "interconnected," and "operatively connected," include direct or indirect connection between first and second components, e.g., there may be one or more other components between the first and second component.

The actuator assembly of the present invention can be used with respect to scotch yoke assemblies, rack and pinion assemblies, and linear actuators. With respect to scotch yoke assemblies, U.S. Pat. No. 8,087,316 ('316 patent) and U.S. Pat. No. 8,863,596 ('596 patent), both of which are incorporated herein by reference for all purposes, disclose double acting scotch yoke actuators as set forth in the '316 patent and single acting scotch yoke actuators as set forth in the '596 patent. With respect to rack and pinion type actuators, a double-acting rack and pinion actuator assembly is disclosed in U.S. Pat. No. 5,492,050 ('050 patent) which is incorporated herein by reference for all purposes.

While the present invention will be described with reference to operation of a valve, it is not so limited. Thus, the invention is applicable to any actuator/driven member assembly. Further, while in the description which follows, the actuator described is a pneumatic, spring return actuator, it will be understood that it could be used with a hydraulic spring return actuator or, with a modified pressure measurement approach to record two pressures, with a pneumatic or hydraulic double acting actuator.

Referring first to FIG. 1, the actuator assembly, shown generally as 10, in one embodiment of the present invention, comprises a first force assembly shown generally as 10A connected to one side of a yoke housing 12, there being an identical force assembly 10B connected to an opposite side of housing 12. Since the construction of force assemblies 10A and 10B are identical, only force assembly 10A will be described. As seen and as described in the aforementioned '316 patent and '596 patent, force assemblies 10A and 10B lie generally on diametrically opposite sides of yoke housing 12. Disposed in yoke housing 12, is a dual yoke 14 connected to a rotatable shaft 16, rotation of yoke 14 resulting in rotation of shaft 16. As is well known, shaft 16 can be connected to a driven assembly, e.g., a valve, particularly a quarter turn valve, to open, close, or throttle the valve.

Force assembly 10A comprises a force module 18 comprising a generally cylindrical casing 20 forming a piston chamber 22. Disposed in piston chamber 22 is piston 24 having an annular seal ring 26, piston 24 being connected to a piston rod 28 which in turn is interconnected to one slot of yoke 14 whereby reciprocal motion of piston 24 results in reciprocal motion of piston rod 28 and rotational motion of yoke 14. A compression spring assembly 30, disposed in piston chamber 22 in surrounding relationship to piston rod 28, biases piston 24 in a direction away from yoke housing 12.

There is an interface assembly shown generally as 32 which is interconnected to one end of casing 20 distal yoke housing 12. Interface assembly 32 includes a plate portion 34 on which is formed a generally centrally located hub 36, having an aperture 38 therethrough. Integral with plate portion 34 is an annular, axially extending flange 40 having a first side 42, a second side 44, and an outer peripheral surface 46. There is a threaded fluid port 48 formed through surface 46 of flange 40, port 48 being in open communication with a passageway 50 formed in flange 40, passageway 50 being in open communication with piston chamber 22. A stop 35 in the form of a threaded stud having a screwdriver slot is recessed in a threaded blind bore in plate portion 34.

Threadedly received in port 48 is a fitting 52 connected to a line 54 which is connected to a source of fluid power, e.g. compressed air or hydraulic fluid (not shown). It will be recognized that as compressed air is introduced through line 54, port 48 and passageway 50, it will engage and force piston 24 in a direction toward yoke housing 12 thereby compressing spring assembly 30. Exhausting air through that pathway results in spring assembly 30 returning piston 24 to the position shown in FIG. 1.

There is also a threaded sensor port 60 formed through surface 46 of flange 40, a sensor adaptor shown generally as 62 being threadedly received in port 60, sensor adaptor 62 being described more fully hereafter.

A tandem force module shown generally as 70 is connected to the flange side of interface assembly 32. Tandem force module 70 comprises a generally cylindrical cartridge 72 forming a second piston chamber 74. Disposed in second piston chamber 74 is a second piston 76 having an axially extending hub 77 which is connected to second piston rod 78, piston rod 78 being receivable in aperture 38 of hub 36, a seal ring 39 providing sealing between piston rod 78 and the surface forming aperture 38.

A threaded fluid (pneumatic) port 80 is formed in an end cap 82 connected to the end of cartridge 72 distal interface assembly 32 whereby fluid can be introduced into chamber 74. A fitting 84 is threadedly received in port 80 and connected to a source of compressed air or the like. As will be appreciated, as air is introduced through port 80, piston 76 is forced in the direction of interface assembly 52 which, as will be seen more fully hereafter, moves piston rod 78 through the aperture 38 formed in hub 36. An adjustable stop 83 comprising a threaded stop rod and nut is received in a threaded bore 83A in end cap 82.

Turning now to FIG. 2, there is shown an indicator plate 90 having a generally circular aperture 92 therethrough. Indicator plate 90 which can be disc shaped, has an outer peripheral surface 94, a first side 95 and a second side 97. A channel 96 is formed in indicator plate 90 through sides 95 and 97, channel 96 having an arcuate portion in open communication with a connecting channel 98 which in turn is in open communication with aperture 92 through plate 90. Formed between the surfaces of aperture 92 and channels 96 and 98 is a deflectable finger 100. There is a threaded bore 102 formed through the peripheral surface 94 of indicator plate 90, there being a set screw 104 received in threaded bore 102. It will be appreciated that as set screw 104 is tightened, finger 100 is forced radially inwardly into engagement with piston rod 78 threadedly securing indicator plate 90 to piston rod 78. It will be appreciated that by loosening set screw 104, indicator plate 90 can be moved longitudinally along piston rod 78 to any desired position and then selectively locked in place in that position without damage to the piston rod 78.

Figure 4:
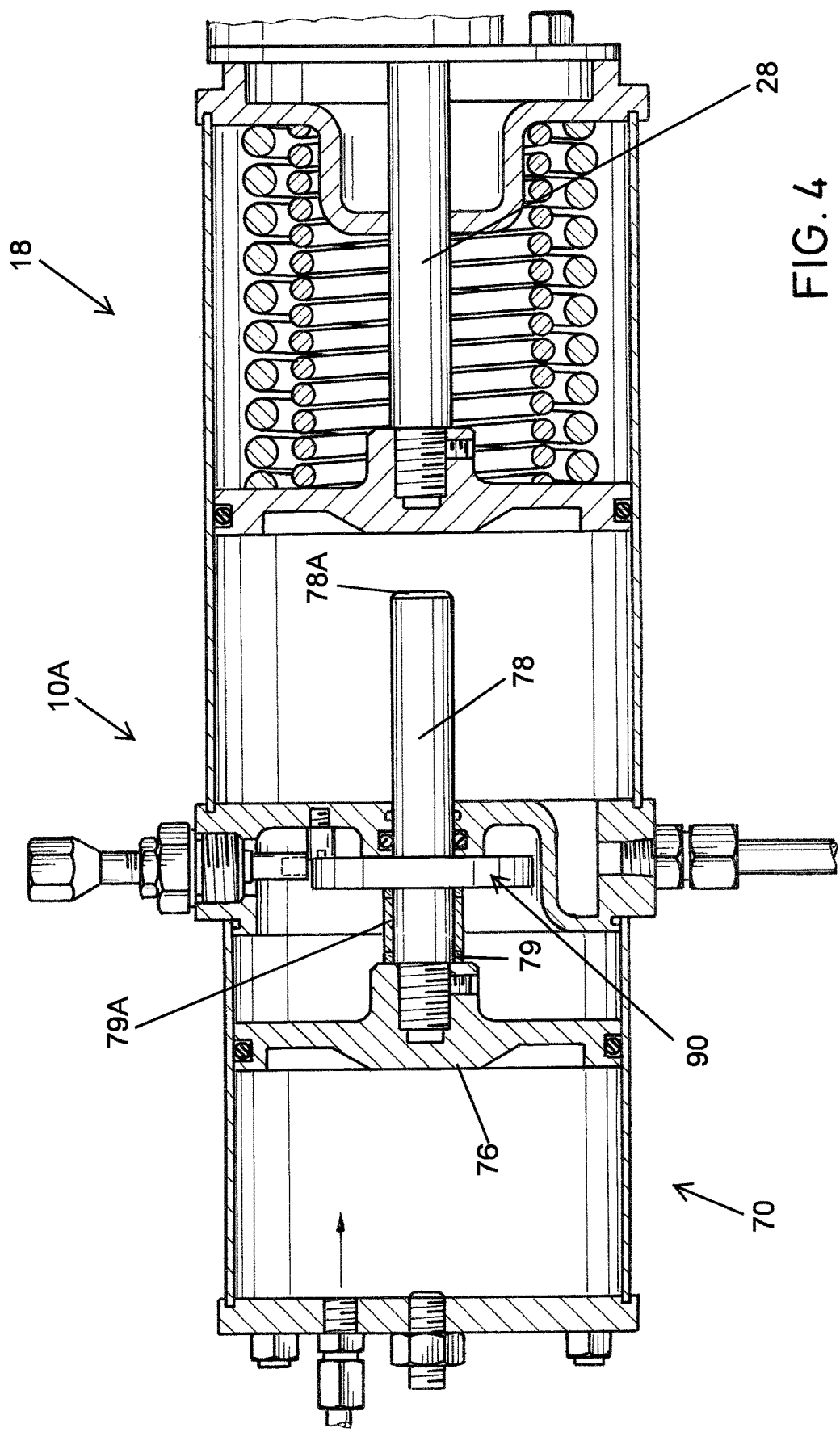
FIG. 4 is a view similar to FIG. 3 showing the actuator assembly of the present invention in a second position.
Figure 5:
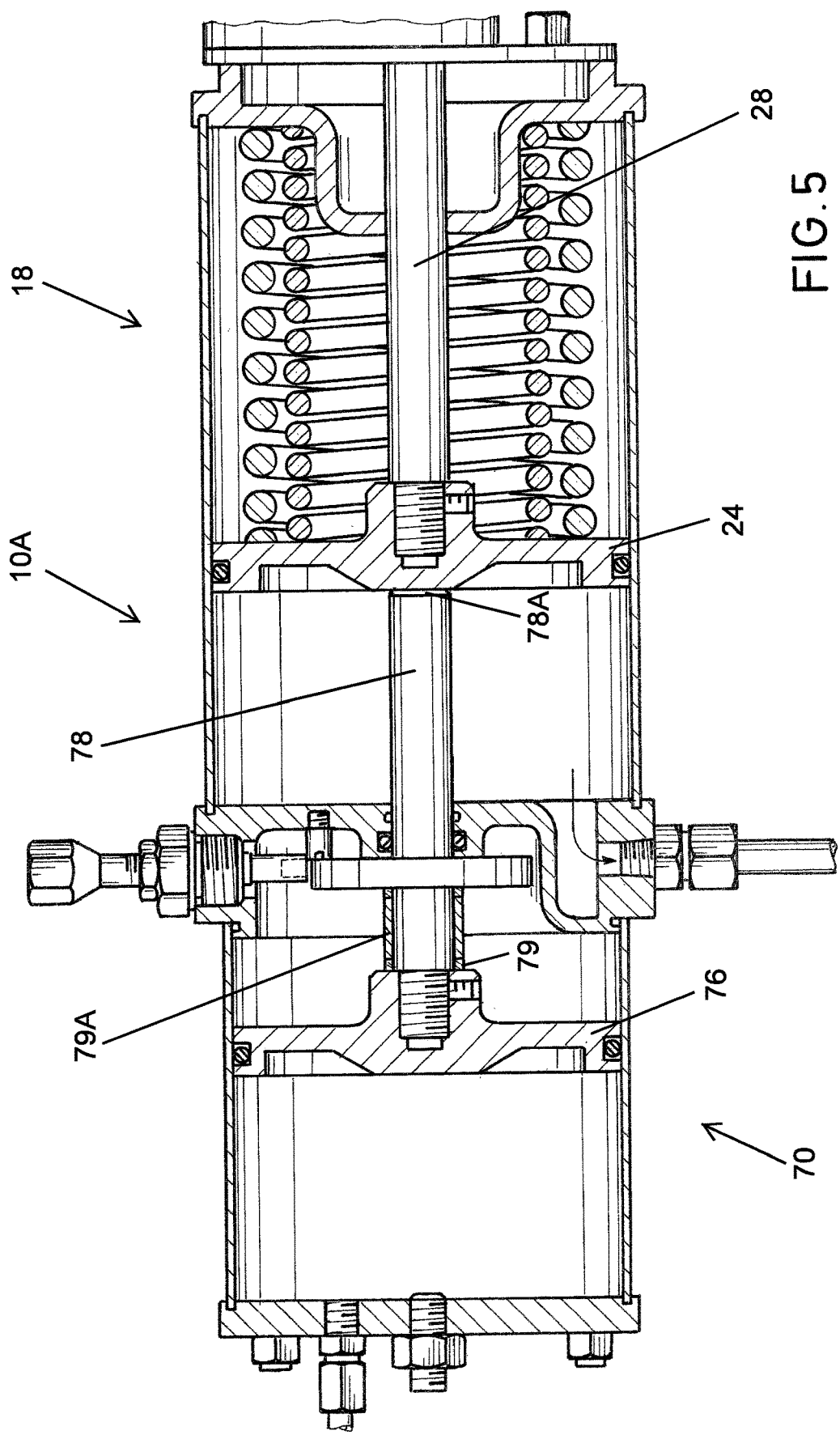
FIG. 5 is a view similar to FIG. 3 showing the actuator assembly of the present invention in a third position.

To ensure that indicator plate 90 remains positioned a desired distance, and depending upon the degree of partial stroke required, from hub 77 of piston 76, one or more spacers can be positioned on piston rod 78 between the hub 77 and indicator plate 90. A single spacer or shim 79 is shown in FIG. 1. It will be appreciated that the number of such shims, spacers, or washers 79 can be varied in accordance with the customer's specifications so as to determine valve travel during the PST. For example, as shown in FIGS. 3, 4, and 5, there are two shims or washers 79 and a spacer collar 79A. Spacers/shims ensure that during a PST, the indicator plate 90 will remain in position on piston rod 78, meaning that indicator plate 90 will always be in register with the sensor used to determine the position of the indicator plate and hence the position of the valve being subjected to the PST.

To assemble force assembly 10A comprised of force module 18 and tandem force module 70, reference is now made to FIGS. 6 and 7. End cap 82 has four symmetrically patterned, laterally outwardly extending ear portions 110, each ear portion 110 having a hole therethrough. Received in each of the holes in ear portions 110 are tie rods 112 on which are threadedly received nuts 114. A second end cap 116, similar to end cap 82, is positioned between housing 12 and casing 20 and has laterally outwardly extending ear portions or projections through which are formed four symmetrically patterned holes, each of the holes in end cap 116 receiving a tie rod 118 on which are threadedly received nuts 120. In practice, when end caps 82 and 116 are properly positioned relative to cartridge 72 and casing 20, respectively, the symmetrically spaced holes in end cap 82 will be in register with the symmetrically spaced holes in end cap 116. Accordingly, respective ones of tie rods 112 and 118 can be brought into register with one another. To this end, and to connect respective tie rods 112 and 118 together, there are four 126 each having a body 128, body 128 being provided threaded bores 130 and 132 into which are received the threaded ends of registering tie rods 112 and 118, respectively. Each of the coupling nuts 126 is provided with a formation, e.g., an open bore, which serves as an indicator of proper engagement. It will be appreciated that the threaded bores 130 and 132 can both have right hand threads or one of the threaded bores 130, 132 can have left hand threads while the other of the bores could have right hand threads. Once the tie rods 112 have been coupled to the tie rods 118, the nuts 114 and 120 can be tightened, whereby force module 18, interface assembly 32, and tandem force module 70 will be compressed together. As seen, the coupling nuts 126 have a hexagonal cross-sectional shape to allow for tightening/loosening by a wrench.

Referring now to FIG. 8, there is shown in greater detail, sensor adapter 62. Sensor adapter 62 is substantially a uniquely modified gland nut and comprises a body 200 having a flange portion 202 and an externally threaded stem 204. There is a threaded bore 206 extending through body 200. An annular, external seal ring groove is formed in body 200 generally at the juncture of flange portion 202 and stem portion 204. A seal ring 210 received in the seal ring groove ensures sealing between body 200 and flange 44 of interface assembly 32. There is a chamfered frustoconical surface formed in flange portion 202 adjacent top surface 202A of flange 202. A threaded sensor carrier 240 having a sensor 242 connected by wires 244 to a suitable electronic recording or indicating device is threadedly received in the threaded bore 206 of body 200. A threaded lock nut 246 on sensor carrier 240 engages and compresses an annular seal 250 positioned in the seal body recess formed by the combination of the frustoconical surface in flange 202, threaded lock nut 246, and sensor carrier 240 when sensor carrier 240 is threaded into adapter body 200. It will be appreciated that once sensor carrier 240 is threadedly received in adapter body 200, lock nut 246 can be tightened to further compress seal 250. As noted above, there is a stop 35 received in plate portion 34 of interface 32. As can be seen with reference to FIG. 2, stop 35 is used to limit the radially inward travel of sensor carrier 240 to ensure proper positioning of sensor 242 relative to indicator plate 90 when indicator plate 90 is in proximity to sensor 242.

Sensor 242 can be of various types. For example, sensor 242 can comprise a proximity sensor, e.g., a capacitive sensor or an inductive sensor, depending on the material of the target, e.g., indicator disc 90, being sensed. Non-limiting examples of proximity sensors include capacitive, inductive, magnetic, etc. It will also be recognized that sensor 242 can comprise a device such as a limit switch, a reed switch, etc. In general, any device on sensor carrier 240 which can detect the presence of indicator disc 90 when indicator disc 90 is in register with the device can be used.

Turning now to FIGS. 1, 3, 4, and 5, the operation of the actuator assembly of the present invention in conducting a partial stroke testing (PST) will be described. In the description which follows it will be assumed that the shaft 16 is connected to a quarter turn valve (not shown). In the position shown in FIG. 1, with the compression spring assembly in the relaxed position as shown in FIG. 1, the valve would be in the fully closed position.

In FIG. 3, pneumatic pressure which has been introduced via conduit 54, port 48, and passageway 50, urges piston 24 and hence piston rod 28 to the right as shown in FIG. 3, thereby compressing spring assembly 30. This can be considered the normal service position of the actuator in which the valve is fully opened. To conduct a PST, and with the valve in the fully open position, pneumatic pressure is introduced via fitting 85 to force tandem piston 76 and hence piston rod 78 carrying indicator plate 90 to the right as shown in FIG. 4. In this position, piston rod 78 extends into chamber 22 and indicator plate 90 has engaged the stop formed by hub 36. As can also be seen, indicator plate 90 is now in register with sensor 242. In other words, and by example only, assuming indicator plate 90 is of metallic construction, and assuming sensor 242 is an inductive type proximity sensor, the position of indicator plate 90 and hence the position of piston rod 78 can now be determined. In this regard, it should be noted that the end surface 78A of piston rod 78 stops short of contacting piston 24 to form a hard stop at a calculated distance from piston 24 with this distance being equal to the amount of travel piston 24 must incur to cause the valve and actuator to travel to the desired PST position. Pressure acting on piston 76 provides the necessary force to provide the hard stop on surface 78A.

Turning now to FIG. 5, the pressure has been exhausted from chamber 22 allowing spring assembly 30 to move piston 24 to the left, as shown in FIG. 5, until it engages stop surface 78A. It will also be recognized that in the position shown in FIG. 5, the valve has been partially closed, i.e., it has been stroked or throttled so that it has been moved a desired amount toward the closed position. Important to the operation, fully all of the pressure has been exhausted thereby allowing the actuator to exert full torque or force to the valve. This ensures that the valve is not stuck in the fully open position. Reapplying pressure to piston 24 will again push it to the right to compress the spring and to return the valve to the fully open position. With reference to FIG. 5, it should also be recognized that should an emergency situation occur, which requires the valve to be moved to the fully closed position, pressure from both piston chambers 22 and 74 can immediately be exhausted allowing compression spring assembly 30 to move both pistons 24 and 76 to the position shown in FIG. 1, thereby completely shutting the valve. As described above, because the indicator plate 90 may, by using the appropriate spacer height, be selectively positioned at any place along the length of piston rod 78, the precisely desired amount of stroking can be easily controlled.

Turning now to FIG. 9 there is shown an embodiment of the present invention in conjunction with a rack and pinion assembly. In the embodiment shown in FIG. 9, the actuator assembly 10, comprised of force assembly 10A and 10B, are substantially identical to those shown in FIG. 1. Accordingly, only the rack and pinion assembly will be described in detail. A housing 300 has one end 302 connected to force assembly 10A while a second end 304 is connected to force assembly 10B. Rotatably mounted in housing 300 is a shaft 306 connected to a pinion 307 such that as pinion 307 rotates, shaft 306 rotates. Engaged with pinion 307 are first and second racks 308 and 310, respectively. Rack 308 is interconnected by a coupling or linkage 312 to piston rod 28 while rack 310 is interconnected by a coupling or linkage 314 to piston rod 28A. It will be appreciated that as piston rods 28 and 28A reciprocate, they will reciprocate racks 308 and 310, respectively, with the result that pinion 307 will rotate and thereby rotate shaft 306.

Turning now to FIG. 10, there is shown an embodiment of the present invention involving linear actuation. In the embodiment shown in FIG. 10, piston rod 28 is interconnected via a coupling or linkage 320 to the shaft 322 of a gate valve shown generally as 324. Gate valve 324 has a body 326 with a throughbore 328 therethrough. Slidably disposed in the bonnet 330 of the gate valve 324 is a gate valve element 332 which can be reciprocated into and out of register with bore 328 to thereby open or close throughbore 328. It will be appreciated that FIG. 10 is a schematic representation and that the bonnet 330 would typically be of longer length and have a longer shaft 322 connected to gate valve element 332 to accommodate movement of the gate valve element 332.

The advantages of the actuator assembly of the present invention are many. For one, the assembly eliminates spurious valve travel during a PST while eliminating false failures. Additionally, the assembly allows full actuator torque output every cycle which is necessary when a valve is experiencing stiction. As noted above, the actuator assembly of the present invention also permits full emergency operation in the event of the need of an emergency shutdown. The actuator assembly also permits an unlimited number and frequency of worry-free PST cycles which is important because increased cycles and frequency further assures proper valve action if emergency shut down is required.

Another distinct advantage of the actuator assembly of the present invention is its modular construction. For example, the body 12 and force module 18 could be fully assembled using tie rods 118 and nuts 130 following which tandem piston module 70 could be connected. This would allow body 12 and force module 18 to remain intact in the event it was desired to remove module 70 for maintenance. Additionally, it will be appreciated that force module 18 could also be removed from the system and disassembled for maintenance. The system allows tandem piston module 70 and module 18 to be worked on independently while module 18 remains intact. The unique construction of the actuator assembly of the present invention vis-à-vis modularity is also demonstrated by the fact that one can purchase the actuator assembly sans the tandem piston module 70 and at a later date install the tandem piston module 70 simply by removing the end cap which would have been connected to casing 20 using tie rods and nuts as described above. In this case, the end cap removed from casing 20 could be used as the end cap for cartridge 72, e.g., end cap 82.

Embodiments of the present invention include, dependent upon user preference, manual and instrumented systems to measure pressure applied to the actuator and the actuator position of travel. Once pressure and position are known and having knowledge of the actuator torque/thrust output based on published information, the present current Safety Margin, actual valve torque/force requirement and the MAST value can be determined and provided to the user.

As related to spring return actuators, the springs have an initial compression value when extended and at the far end of stroke and greater compression at the opposite end of the actuator stroke. As air, or hydraulic pressure, is applied to the actuator piston, the resulting piston force acts against the spring causing additional spring compression and actuator motion. A typical example would be an actuator with a spring designed so that at the end of stroke, the spring force is equivalent to a pressure related force of 40% of the full pressure force. At full travel, the spring force may typically be equivalent to 60% of the full pressure force. In this manner, as the applied pressure increase from 0 to maximum, the actuator, with no valve attached, will begin to stroke when the applied pressure equals 40% of maximum and will be fully stroked when the applied pressure equals 60% of the maximum pressure. At all travel positions, the output of the actuator can be calculated based on the measured difference between the applied pressure and the relative stroke position of the actuator.

The present invention employs the measured pressure and the actuator stroke position and published actuator output data to calculate the Safety Margin, Valve torque/thrust and percentage of MAST.

If an actuator is fully stroked and the spring fully compressed, the present invention calculates the actual actuator output, compares it to published data and thereby calculates the valve resistance (torque/thrust requirement) throughout the entire stroke of the actuator and in both stroke directions. For example, if by design an actuator with no valve attached would be expected to initiate stroke when the applied pressure falls below the example's 60% value, but stroke begins at 55% when a valve is attached, then the valve resistance to motion equals 5% of the maximum pressure. In terms of pressure, if full pressure to an actuator is 80 psig then initial spring compression will begins at 32 psig (40% of 80) and the spring will be fully compressed at 48 psig (60% of 80). If upon reducing the applied pressure, motion noes not begin until the 55% value (44 psig) then the valve resistance to motion equates to 4 psig acting on the actuator piston.

Given the actuator's published maximum spring output (spring fully compressed, 0 psig applied pressure to the actuator piston) plus the published actuator output caused by application of the maximum pressure, the output as related purely to the applied pressure can be obtained. For example, based on a published actuator spring output of 600 units and a published air output of 400 units when full pressure (80 psig) is applied, it can be derived that the output from pressure if the spring were removed would be 1,000 units.

The actuator output caused by the above 4 psig difference is equal to 1,000×4/80=50 units. Therefore, the valve resistance is equal to 50 units of output. Because it is known that the actuator output with zero pressure equals 600 units (spring output), by dividing 600 by 50 it is determined that the actuator is capable of outputting 12 times the valve resistance and that the Safety Margin is 12.

For other stroke positions, the spring caused actuator output is equal to 600 at full stroke and 400 at the end of stroke and that spring caused output varies between these two values by stroke position which is determinable from published actuator data. The spring output at any stroke position is measured, the pressure at which this stroke position would occur if no valve is attached can also be determined. If 48 psig is full stroke and 32 psig is end of stroke with no valve attached, then ½ stroke would occur at 40 psig and spring output at half stroke would be 500 units at 0 psig, 0 units at 40 psig and 250 units at 20 psig, etc. Therefore if, when a valve is attached, it is possible to measure the actual pressure at given stroke positions (or every position), know the pressure at which the actuator should have stroked this amount, calculate the difference between the two pressure values and then calculate the valve resistance.

For example, if the stroke is ½ of full travel and pressure with valve attached=30 psig (10 psig lower than expected) and if spring output at ½ stroke is 500 units, then the spring output (valve resistance)=500×10/40=125 units. Given that at 0 psig the actuator output would be 500 units, the calculated Safety Margin would then be 500/125=4, valve resistance=125 units and the percentage of MAST=12.5% assuming for this example that MAST=1,000 units.

Each test for Safety Margin therefore provides valuable information to the user regarding the ability of the actuator to operate the valve. In the present invention, this information can be retained in memory such that current and past results are shown graphically, thereby providing the user with trend knowledge and the ability to quickly determine if, over time, there is deterioration of the actuator performance or increasing valve resistance. Observing trend data enables the user to predict requirements and to knowingly await the next scheduled maintenance or to arrange earlier maintenance.

Figure 11:
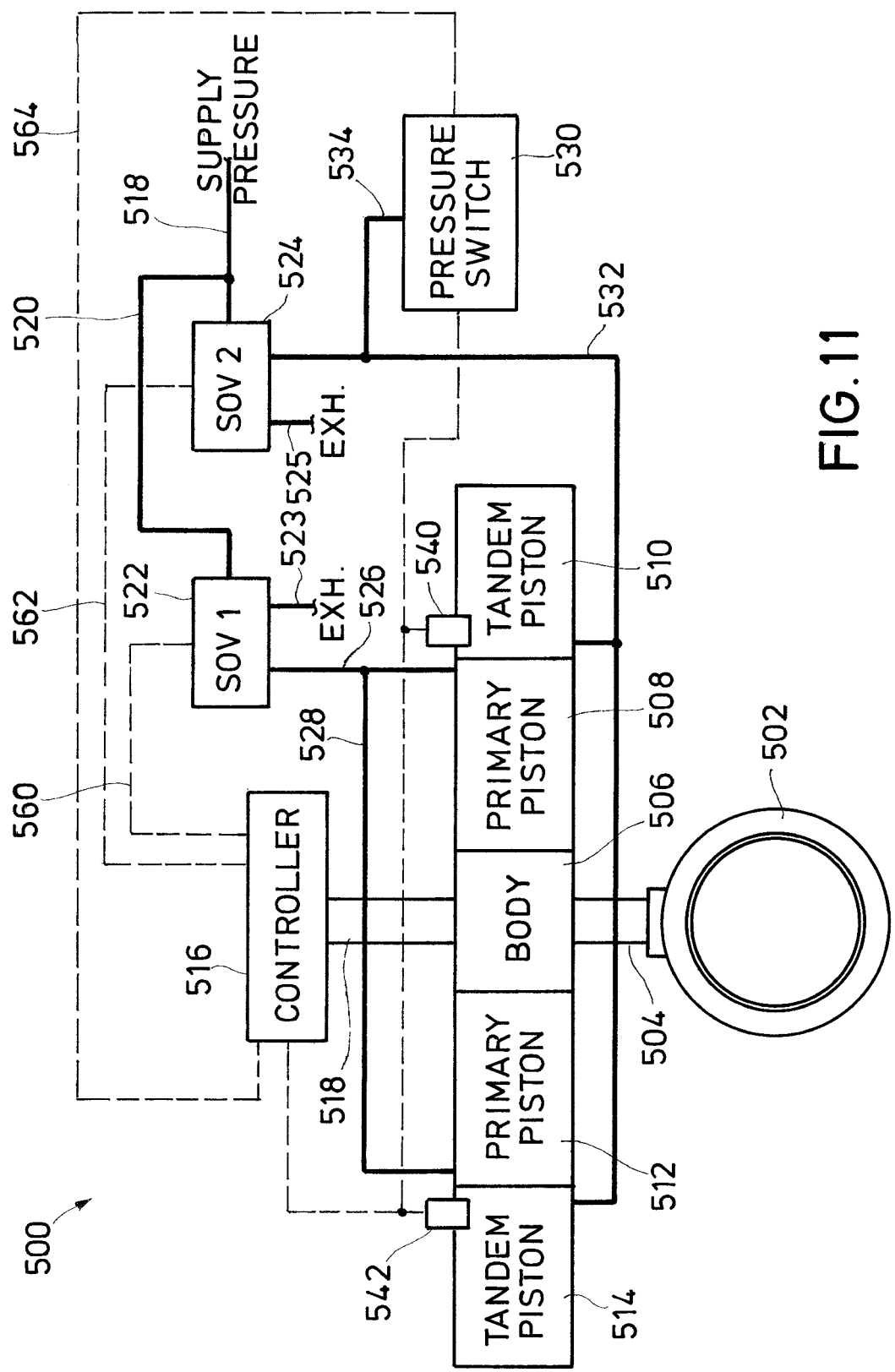
FIG. 11 is a schematic drawing of one embodiment of the system of the present invention.

Referring now to FIG. 11 there is shown schematically one embodiment of the system of the present invention. The embodiment shown generally as 500 in FIG. 11, as will be seen hereafter, comprises two spring return force modules but it is to be understood that the system of the present invention could be employed with a single spring return actuator.

Referring then to FIG. 11, the system 500 comprises a valve 502, which can be a quarter turn valve such as a butterfly valve, ball valve, etc. Valve 502 has a shaft 504 which extends into a body 506 described more fully hereafter. Connected to one side of body 506 is a first spring return actuator 508 housing a primary piston, actuator 508 in turn being coupled to a first tandem force module 510 having a first tandem piston as described above. Connected to the other side of body 506 is a second primary actuator having a second primary piston 512, a second tandem piston 514 being coupled to primary piston 512 in the manner described above. Body 506 houses an assembly interconnecting valve shaft 504 and connecting links between the piston rods of first primary actuator 508 and second primary actuator 512. A controller 516 is operatively connected to a shaft 518, which is operatively coupled to shaft 404 whereby any rotation of shaft 504 is sensed by controller 516. A fluid pressure source (not shown) supplies fluid pressure via line 518 to a media, e.g., hydraulics, circuit comprised of conduit 520 which is connected to a first solenoid valve 522 and a second solenoid valve 524. Fluid pressure is supplied to primary actuators 508 and 512 via lines 526 and 528, respectively. Fluid pressure from solenoid valve 524 is also supplied to a pressure switch 530 via lines 532 and 534, line 532 also supplying fluid pressure to first tandem force module 510 and second tandem piston 514. There is a first proximity switch 540 as described in the description above with respect to the actuator assemblies on first tandem force module 510, and a second proximity switch 542 operatively connected to second tandem force module 514. An electronic signal transmission line 560 connects controller 516 to solenoid valve 522. A second electronic signal transmission line 562 connects controller 516 and solenoid valve 524. Controller 516 is also electrically connected to pressure switch 530 by a line 564, which in turn is electrically connected in series to proximity switches 540 and 542, and back to controller 516.

In operation, it will be understood that the system shown in FIG. 11 is designed to determine certain characteristics of valve 502 and that valve 502 is in the operating position, i.e., open, and controlling flow. Thus, primary actuators 508 and 512 would be pressurized via solenoid valve 522 and supply pressure lines 520, 526, and 528.

To start the test, e.g., and determine the operating characteristics of valve 502, e.g., is valve 502 in a stuck position, controller 516 sends a signal to solenoid valve 524 to supply pressure to tandem force modules 510 and 514. Since those fluid supply lines are in open communication with pressure switch 530, pressure switch 530 detects that the tandem force modules have been pressurized and, via proximity switches 540 and 542, that the pistons in tandem force modules 510 and 514 have moved to the desired position. Once controller 516 receives a signal that the tandem force modules 510 and 514 have been pressurized, controller now signals solenoid 524 to exhaust pressure via exhaust port 525 and allow the pistons in the tandem force modules 510 and 514 to return to their unpressurized positions. Controller 516 then signals solenoid valve 524 to again pressurize tandem force modules 510 and 514 until the position indicators carried by the tandem pistons have moved to a point to be in register with proximity switches 540 and 542. The signals from proximity switches 540 and 542 at that time confirm to controller 516 that the tandem force modules 510 and 514 are properly operating. Satisfied that the tandem force modules 510 and 514 are operating properly, controller 516 then signals solenoid valve 522 to exhaust pressure from the primary actuators 508 and 512 via exhaust port 523. As pressure exhausts from the primary actuators 508 and 512, the springs therein will act against the pistons in primary actuators 508 and 512 causing the piston rods connected to the pistons, and also operatively connected to the valve shaft 504 to apply force to valve shaft 504 to attempt to rotate valve shaft 504. Any such rotation will be detected by controller 516 which, as noted above, is operatively connected via shaft 518 to shaft 504. Via a processor in controller 516, the pressure at which shaft 504 initially moves is detected and can be converted to a signal which can be observed at the site of the valve 502 or remotely in a control room or the like. Should controller 516 not detect any movement of valve shaft 504, this tells the user that valve 502 is in a stuck position for any number of reasons.

Accordingly, the user can take necessary steps to repair or replace valve 502 if necessary.

The processor in controller 516 can be configured to detect and record the pressure in the primary actuators 508 and 512 throughout a full 90° travel of valve 502 in both directions, and can provide such data for all travel positions.

The processor in controller 516 can also be programmed, in a manner well known to those skilled in the art, to calculate valve torque, Safety Margin, and percentage of valve MAST being applied. One of the features of the system of the present invention, as described above with respect to the description of the actuator assemblies, is that during the test procedure, tandem force modules 510 and 514 prevent excess travel. In other words, the travel stop present in the tandem pistons ensures that the valve will not travel past a user-defined position thereby eliminating the concern for process interruption.

The fact that the system of the present invention allows full pressure release and assures valve motion without over travel, enables accurate measurement of the pressure at which movement first occurs. This data combined with position measurement allows calculation of Safety Margin, valve torque/thrust required, and the percentage of valve MAST being applied.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A system for determining safety margin of a driven member, comprising:
   an actuator assembly comprising:
      a movable output shaft connectable to said driven member;
      a primary force module, said primary force module comprising:
         a casing having a first end, a second end, and forming a first piston chamber;
         a first piston mounted in said first piston chamber for reciprocal movement therein;
         a first piston rod connected on a first end to said first piston and operatively connected on a second end to said movable shaft whereby reciprocal motion of said first piston causes movement of said movable shaft;
         a compression spring disposed in said first piston chamber between said first piston and said first end;
      a tandem piston module, said tandem piston module comprising:
         a cartridge having a first end, a second end, and forming a second piston chamber;
         a second piston mounted in said second piston chamber for reciprocal movement therein, said second piston dividing said second piston chamber into a first portion between said second piston and said second end of said cartridge and a second portion between said piston and said first end of said cartridge;

a second piston rod connected to said second piston for reciprocal movement with said second piston;

a selectively positionable position indicator mounted on said second piston rod;

a first fluid port in open communication with said second portion of said second piston chamber;

an interface positioned between said first end of said cartridge and said second end of said casing, said interface comprising:

a plate portion having a first side, and a second side, said first side being proximal said second end of said casing, said plate portion having an opening therethrough allowing reciprocal motion of said second piston rod through said plate portion;

an annular, axially extending flange projecting from said second side of said plate portion and having a peripheral surface;

a proximity sensor operatively connected to said first portion of said second piston chamber;

a fluid port extending radially through said peripheral surface of said flange and providing open communication with said first piston chamber;

a controller, said controller being operative to detect movement of said movable shaft;

a first valve connected to said controller, said first valve having a first fluid inlet and a first fluid outlet, said first fluid outlet being connected to said second portion of said second piston chamber, said first valve being responsive to a signal from said controller to cause pressure to move said second piston toward said second end of said cartridge and said position indicator in first register with said proximity sensor;

a second valve connected to said controller, said second valve having a second fluid inlet and an exhaust port, said fluid second fluid inlet being connected to said fluid port;

said controller being operative to signal said first valve to exhaust pressure from said second portion of said second piston chamber when said position indicator is in said first register with said proximity sensor;

said controller being operative to signal said first valve to supply pressure to said second portion of said second piston chamber to move said position indicator back in second register with said proximity sensor;

said controller being operative to signal said second valve to exhaust pressure from said first piston chamber when said second register occurs whereby said spring causes initial movement of said movable shaft;

said controller sensing said initial movement of said movable shaft and pressure in said first piston chamber at said initial movement.

2. The system of claim 1, wherein there is a stop formed on said second side of said plate portion, said position indicator engaging said stop when said position indicator is in register with said proximity sensor.

3. The system of claim 1, wherein said controller senses pressure in said first piston chamber when said initial movement of said moveable shaft occurs.

4. The system of claim 1, wherein said driven member comprises a shaft of a valve.

5. The system of claim 4, wherein said controller comprises a processor, said processor being operative to calculate safety margin, valve torque and percentage of valve MAST.

6. The system of claim 5, wherein said controller is operative to generate indication of and transmit signals, at least one of safety margin, valve torque and percentage of valve MAST.

7. The system of claim 6, wherein said signal is indicative of safety margin and can be visually, audibly or electronically observed locally proximate said valve or at a site remote from said valve.

* * * * *